July 5, 1960

R. E. BACHMAN 2,943,507

PRECISION GEAR TRAIN

Original Filed Oct. 21, 1957

INVENTOR.
RUDOLPH E. BACHMAN
BY
*Leonard H. King*

United States Patent Office 2,943,507
Patented July 5, 1960

2,943,507
PRECISION GEAR TRAIN

Rudolph E. Bachman, Port Washington, N.Y., assignor to Sterling Precision Corporation, Flushing, N.Y.

Original application Oct. 21, 1957, Ser. No. 692,432. Divided and this application Aug. 25, 1958, Ser. No. 756,889

2 Claims. (Cl. 74—421)

The present invention relates to precision speed reducing gear mechanisms and particularly to a single-ended device wherein the input and output shafts are concentric. The present device is primarily directed to achieving maximum compactness in speed reducing gear mechanisms. While it is appreciated that gear trains may be interposed between an input and an output shaft to affect speed reduction, it is proposed that novel rearrangement of the gear components be employed to achieve such maximum compactness. For example, within the small confines of a miniaturized guided missile, it may be impossible to position a conventional speed reducing device as there would be no room for an in-line or cascaded series of such components, whereas a singled ended device would solve this presently existing need.

A further advantage for such a single-ended arrangement is that the housing or enclosure used for the mechanism need have only one common opening for the two shafts, therefore dust-sealing, where required, is greatly facilitated.

It should also be noted that in developing prototype and experimental models, as of servo-mechanisms for example, the use of "breadboard equipment" is becoming increasingly popular, as costly drafting, machining and assembly work are considerably reduced. The present device is especially adapted to be mounted on such a breadboard. The single-ended shaft arrangement enables the design and development engineer to position a number of mechanisms of this type in a limited area, to work out different component arrangements and make tests where the use of in-line or two-ended gear reduction mechanisms would be unsuited for this purpose in that they necessitate additional rows of gears, shafts and bearing supports.

It is therefore an object of the present invention to provide speed reduction means having maximum compactness.

Yet another object of the present invention is to provide for improved arrangement of speed-reducing mechanisms on a breadboard or the like, whereby in-line or two-ended gear reduction mechanisms are eliminated.

These and other objects and advantages will become apparent from the following description and drawings and the appended claims.

Figure 3:
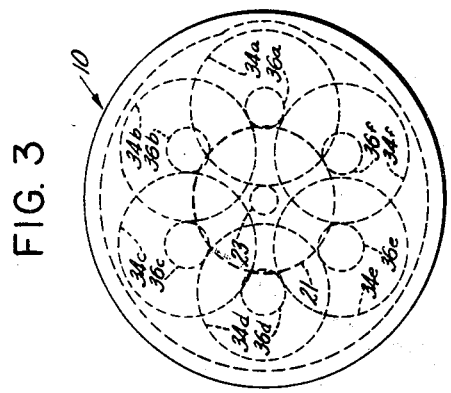
Figure 3 is a view of the sealed end of the device of the present invention, showing the arrangement of the gears in the gear train.
Figure 1:
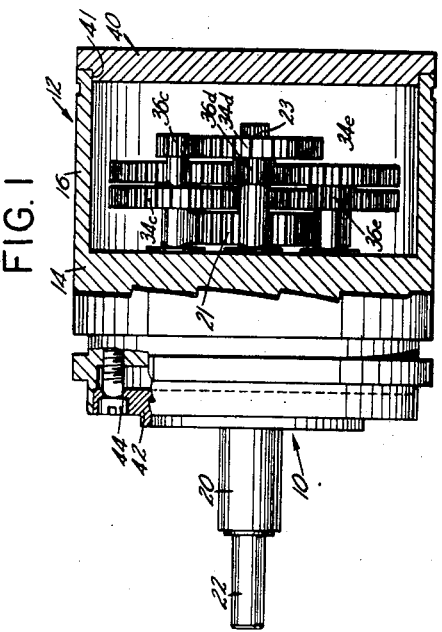
Figure 1 is a side view partly in cross-section of the device of this invention.
Figure 2:
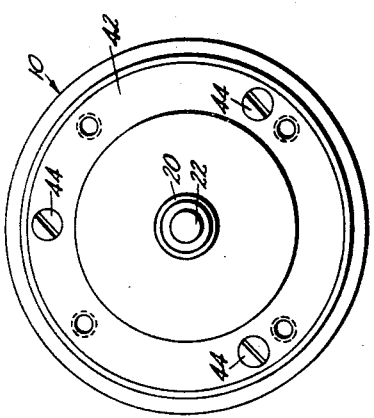
Figure 2 is a view of the shaft end of the device of the present invention.
Figure 4:
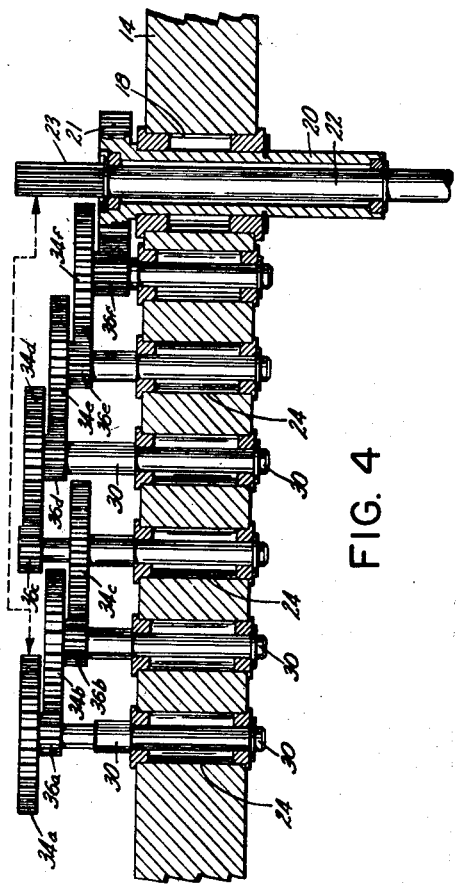
Figure 4 is a developed view of a gear train used in a device of the present invention.

Referring now to the drawings, the device, characterized generally by the numeral 10, comprises a cup-shaped member 12, having thickened base portion 14, and a cylindrical wall portion 16. Base portion 14 has a central aperture 18 through which passes hollow input shaft 20 provided with a spur portion 21 and concentric therewith an output shaft 22, provided with a pinion portion 23. Base portion 14 is provided with a plurality of openings 24, in which are positioned a plurality of idler shafts 30, which mount spur gears 34a-f and pinions 36a-f, the said gears and pinions meshing together to comprise a gear train effectively connecting spur 21 with pinion 23, thus imparting the desired speed reduction between shaft 20 and shaft 22. While the embodiment illustrated shows a system of six idler shafts in annular arrangement (see Figure 3), each shaft having a pair of gears affixed thereto, it will be of course understood that variations may be made in number of shafts and number of gears employed, to yield different gear ratios as desired.

Shaft 20 is preferably mounted on suitable bearings, such as ball bearings, which are positioned in aperture 18 and is retained by a suitable ring. Similarly shafts 30 are each mounted on suitable bearings, such as ball bearings, positioned in the respective openings 24 and retained therein by suitable rings. Output shaft 22, which passes through the hollow bore of shaft 20, is freely rotatable within said hollow shaft by means of suitable bearings and is retained by suitable rings.

It is a specific feature of the present invention that the device is singled-ended, i.e., the shafts are concentric and are positioned at one end of the device, the other end being sealed off by a simple closure plate 40 which is joined to cylindrical wall portion 16 by a force-fit at step-portion 41. A closure plate 42 is provided for the shaft end of the device, said plate 42 having a central opening through which the concentric shafts pass. Plate 42 is rigidly joined to base portion 14 by bolts 44.

It will be noted that the device can be manufactured and assembled with great ease and economy. A single cup-shaped member 12 can be used to provide the mounting and supporting plate for the gear shafts and also to furnish a substantial part of the housing enclosure. Multiplicity of supporting plates for the shaft ends is thus avoided. Not only does this effect substantial economies in manufacture, but minimizes misalignment and excessive gear wear.

It is a complex machining task to bore identically located holes in two separate plates within the close tolerance required in a precision apparatus.

To additionally mount two plates with the openings so precisely aligned that shafts mounted with one shaft end supported in each plate are also precisely aligned creates serious manufacturing problems.

It should be further noted that the housing means employed in the present device result in a maximum protection against dust, since only one opening into the interior of the housing is provided for the concentric shafts.

The single-ended shaft arrangement enables the gear reduction device of the present invention to be utilized for compact installations, where space is at a premium, as in guided missiles. Another application would be for use with bread-board layouts, in design work and development of prototype models.

While I have shown a preferred embodiment of the present invention, changes and modifications within the scope of the invention will suggest themselves to those skilled in the art without, however, departing from the scope of the invention.

I claim:

1. A gear ratio reducing mechanism adapted to be used in combination with miniature motors and the like, comprising in combination: a relatively thick mounting plate provided with a centrally located bearing means and with a plurality of spaced bearing means radially deployed with respect to said centrally located bearing means; a plurality of cantilevered shafts having one end rotatably positioned in each of said spaced bearing means and one end extending outwardly of said mounting plate; means to prevent axial movement of said cantilevered shafts; a pair of gears mounted on each of said outwardly extending ends of said cantilevered shafts, each of said gears being arranged to engage an adjacent gear so as to form a cascaded gear train; a hollow input shaft rotatbly supported by said centrally located bearing means and having a free end and a geared end; an output shaft extending through and being rotatably supported by said hollow shaft, said output shaft having a free portion and a geared end; means to prevent axial movement of said output shaft, and the gear end of said output shaft being arranged to engage said cascaded gear train; the geared end of said input shaft, the geared end of said output shaft and the gears of said cascaded gear train being disposed on one side of said mounting plate and the free end of said hollow shaft and the free end of the shaft supported in said hollow shaft being arranged to extend concentrically outwardly on the other side of said mounting plate.

2. A gear ratio reducing mechanism adapted to be used in combination with miniature motors and the like, comprising in combination: a cup-shaped member having a cylindrical wall portion and a relatively thick mounting plate provided with a centrally located bearing means and with a plurality of spaced bearing means radially deployed with respect to said centrally located bearing means; a plurality of cantilevered shafts having one end rotatably positioned in each of said spaced bearing means and one end extending outwardly of said mounting plate; means to prevent axial movement of said cantilevered shafts; a pair of gears mounted on each of said outwardly extending ends of said cantilevered shafts, each of said gears being arranged to engage an adjacent gear so as to form a cascaded gear train; a hollow input shaft rotatably supported by said centrally located bearing means and having a free end and a geared end; an output shaft extending through and being rotatably supported by said hollow shaft, said output shaft having a free portion and a geared end; means to prevent axial movement of said output shaft, and the gear end of said output shaft being arranged to engage said cascaded gear train; the geared end of said input shaft, the geared end of said output shaft and the gears of said cascaded gear train being disposed within said cup-shaped member and on one side of said mounting plate and the free end of said hollow shaft and the free end of the shaft supported in said hollow shaft being arranged to extend concentrically outward on the other side of said mounting plate.

References Cited in the file of this patent

UNITED STATES PATENTS

| 1,344,439 | Cady | June 22, 1920 |
| 2,062,103 | Perry | Nov. 24, 1936 |
| 2,177,234 | Walser | Oct. 24, 1939 |

FOREIGN PATENTS

| 327,356 | France | June 20, 1903 |